(12) United States Patent
Rokhsaz

(10) Patent No.: US 7,515,668 B1
(45) Date of Patent: Apr. 7, 2009

(54) DATA AND/OR CLOCK RECOVERY CIRCUITS WITH SAMPLING OFFSET CORRECTION

(75) Inventor: Shahriar Rokhsaz, Austin, TX (US)

(73) Assignee: XILINX, Inc., San Jose, CA (US)

( * ) Notice: Subject to any disclaimer, the term of this patent is extended or adjusted under 35 U.S.C. 154(b) by 794 days.

(21) Appl. No.: 11/044,474

(22) Filed: Jan. 26, 2005

(51) Int. Cl.
*H04L 7/00* (2006.01)
*H04L 27/06* (2006.01)
*H03D 3/26* (2006.01)

(52) U.S. Cl. .................. 375/355; 375/376; 375/340

(58) Field of Classification Search ............ 375/355, 375/371, 373–376, 340; 327/141–163
See application file for complete search history.

(56) References Cited

U.S. PATENT DOCUMENTS 7,149,269 B2 * 12/2006 Cranford et al. ............ 375/373
2006/0140317 A1 * 6/2006 Di Gregorio ................ 375/354

* cited by examiner

*Primary Examiner*—Tesfaldet Bocure
(74) *Attorney, Agent, or Firm*—Timothy Markison; Justin Liu

(57) ABSTRACT

A method for correcting sampling offset of a clock and data recovery circuit begins for consecutive data bits having a transition there between by sampling, using an edge sampling point, the transition to produce a sampled transition. The method continues by determining whether the sampled transition is of an intermediate value. The method continues when the sampled transition is not of the intermediate value, by adjusting sampling position of incoming data of the clock and data recovery circuit.

19 Claims, 8 Drawing Sheets

MGT clock and data recovery circuit 20 pulse generator 32 input section 30 sample position adjust module 40

DATA AND/OR CLOCK RECOVERY CIRCUITS WITH SAMPLING OFFSET CORRECTION

BACKGROUND OF THE INVENTION

1. Technical Field of the Invention

This invention relates generally to communication systems and more particularly to data and/or clock recovery circuits used therein.

2. Description of Related Art

Communication systems are known to transport large amounts of data between a plurality of end user devices, which, for example, include telephones, facsimile machines, computers, television sets, cellular telephones, personal digital assistants, etc. As is also known, such communication systems may be local area networks (LANs) and/or wide area networks (WANs) that are stand-alone communication systems or interconnected to other LANs and/or WANs as part of a public switched telephone network (PSTN), packet switched data network (PSDN), integrated service digital network (ISDN), the Internet, etc. As is further known, communication systems include a plurality of system equipment to facilitate the transporting of data. Such system equipment includes, but is not limited to, routers, switches, bridges, gateways, protocol converters, frame relays, private branch exchanges, etc.

The transportation of data within communication systems is typically governed by one or more standards that ensure the integrity of data conveyances and fairness of access for data conveyances. For example, there are a variety of Ethernet standards that govern serial transmissions within a communication system at data rates of 10 megabits per second, 100 megabits per second, 1 gigabit per second and beyond. Another standard, which is for fiber optic data conveyances, is Synchronous Optical NETwork (SONET) that provides various high data rate protocols, including one for 10 gigabits per second. In accordance with such standards, many system components and end user devices of a communication system transport data via serial transmission paths. Internally, however, the system components and end user devices process data in a parallel manner. As such, each system component and end user device must receive the serial data and convert the serial data into parallel data without loss of information.

Accurate recovery of information from high-speed serial transmissions typically requires transceiver components to operate at clock rates that are one-half or higher than the rate of the received serial data, which, for today's high-speed systems, requires very high clock rates. Such high clock rates limit the usefulness of prior art clock and data recovery circuits since such clock and data recovery circuits require precise alignment of the received serial data with the high-speed clock to recover an embedded clock signal in the data stream and/or to recover the data, which is difficult to achieve using today's integrated circuit fabrication techniques. In addition, the high-speed serial data requires the clock and data recovery circuits to have a bandwidth wide enough to handle the high-speed serial data, which is also difficult to achieve using today's integrated circuit fabrication techniques.

Despite the above mentioned issues, the trend is for greater data rates and greater precision of high-speed serial transceivers (i.e., a transmitter and a receiver, where the receiver includes a clock and data recovery circuit). The increased throughput demands are pushing some current integrated circuit manufacturing processes to their operating limits, where integrated circuit processing limits (e.g., device parasitics, trace sizes, propagation delays, device sizes, etc.) and integrated circuit (IC) fabrication limits (e.g., IC layout, frequency response of the packaging, frequency response of bonding wires, etc.) limit the speed at which the high-speed serial transceiver, and particularly the clock and data recovery circuit, may operate without excessive jitter and/or noise.

A further alternative for high-speed serial transceivers is to use an IC technology that inherently provides for greater speeds. For instance, switching from a CMOS process to a silicon germanium or gallium arsenide process would allow integrated circuit transceivers to operate at greater speeds, but at substantially increased manufacturing costs. Currently, for most commercial-grade applications, including communication systems, such alternate integrated circuit fabrication processes are too cost prohibitive for wide spread use. In additional to the cost of these alternative IC fabrication processes, they do not lend themselves well to large-scale integration, especially when compared to CMOS IC fabrication processes, silicon germanium or gallium arsenide IC processes are not for complex system functionalities.

Therefore, a need exists for a method and apparatus that can accurately recover data and a clock signal from received high-speed serial transmissions.

BRIEF SUMMARY OF THE INVENTION

The clock and data recovery circuit with sampling offset correction of the present invention substantially meets these needs and others. In one embodiment, a method for correcting sampling offset of a clock and data recovery circuit begins for consecutive data bits having a transition therebetween by sampling, using an edge sampling point, the transition to produce a sampled transition. The method continues by determining whether the sampled transition is of an intermediate value. The method continues when the sampled transition is not of the intermediate value, by adjusting sampling position of incoming data of the clock and data recovery circuit.

In another embodiment, a clock and data recovery circuit with dynamic offset adjust includes an input section, a pulse generator, a charge pump, a loop filter, a voltage controlled oscillator, and a sample position adjust module. The input section is operably coupled to receive an incoming stream of data and a feedback clock and produces, therefrom, an even data stream, an odd data stream, phase information of the incoming stream of data, and transition information of the incoming stream of data. The pulse generator is operably coupled to produce an enable signal from the transition information. The charge pump is operably coupled to produce a control current signal based on the phase information and the transition information. The loop filter is operably coupled to produce a control voltage based on the control current signal. The voltage controlled oscillator is operably coupled to produce an output oscillation based on the control voltage, wherein the feedback clock is based on the output oscillation. The sample position adjust module is operably coupled to adjust the control current signal based on the enable signal and an edge of the incoming stream of data.

DETAILED DESCRIPTION OF THE INVENTION

Figure 1:
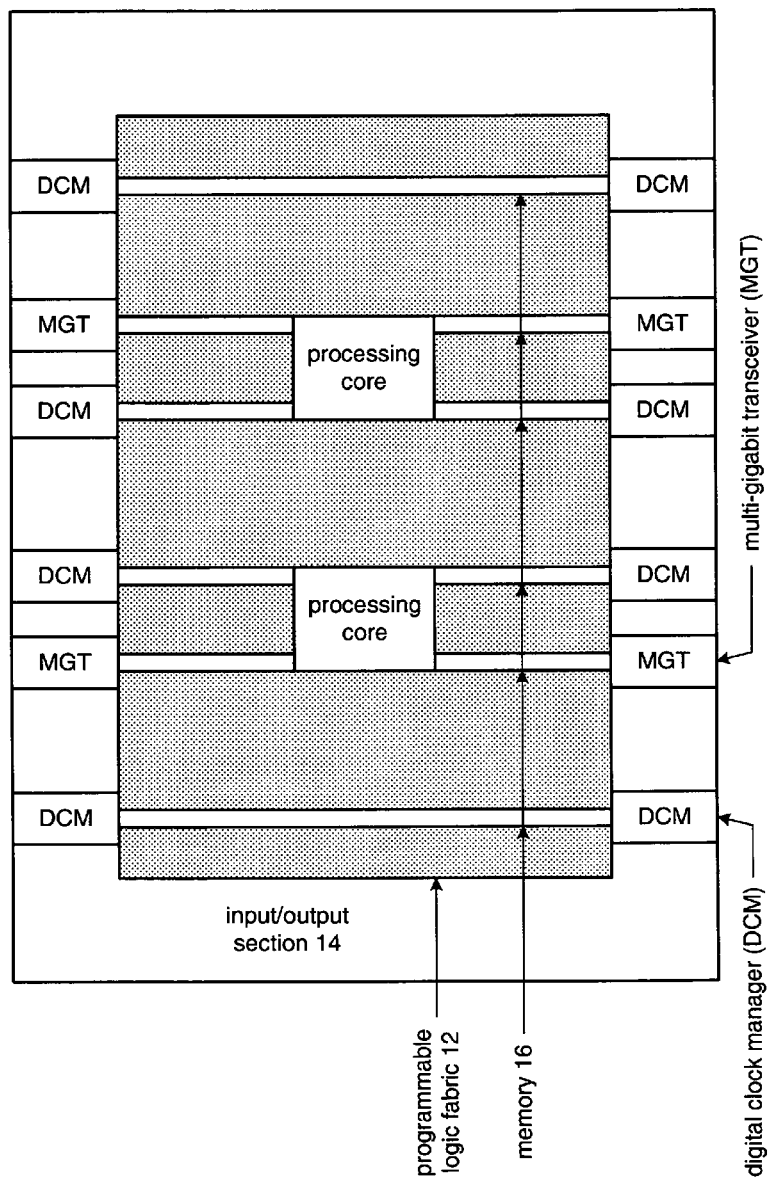
FIG. 1 is a schematic block diagram of a programmable logic device in accordance with the present invention.

FIG. 1 is a schematic block diagram of a programmable logic device 10 that includes programmable logic fabric 12, an input/output section 14, and memory 16. The programmable logic fabric 12 may include one or more processing cores and programmable logic circuitry. Such programmable logic circuitry may include programmable logic arrays (PLAs), programmable array logic (PAL) devices, erasable programmable logic devices (EPLDs) and/or programmable gate arrays (PGAs). Memory 16 may be block random access memory (BRAM). Input/output section 14 may include a plurality of digital clock managers (DCMs) and a plurality of multi-gigabit transceivers (MGTs).

The digital clock managers provide various clock signals to the programmable logic fabric 12 and may further provide clock signals to the multi-gigabit transceivers. The multi-gigabit transceivers provide digital interfaces for the programmable logic fabric 12 to exchange data with components external to the programmable logic device 10. In general, the multi-gigabit transceivers provide serial-to-parallel conversion of received serial data and provide parallel-to-serial conversion for outgoing data. Further, the digital clock managers may provide clock signals to memory, or other input/output modules, for double data rate and quad data rate accesses.

Figure 2:
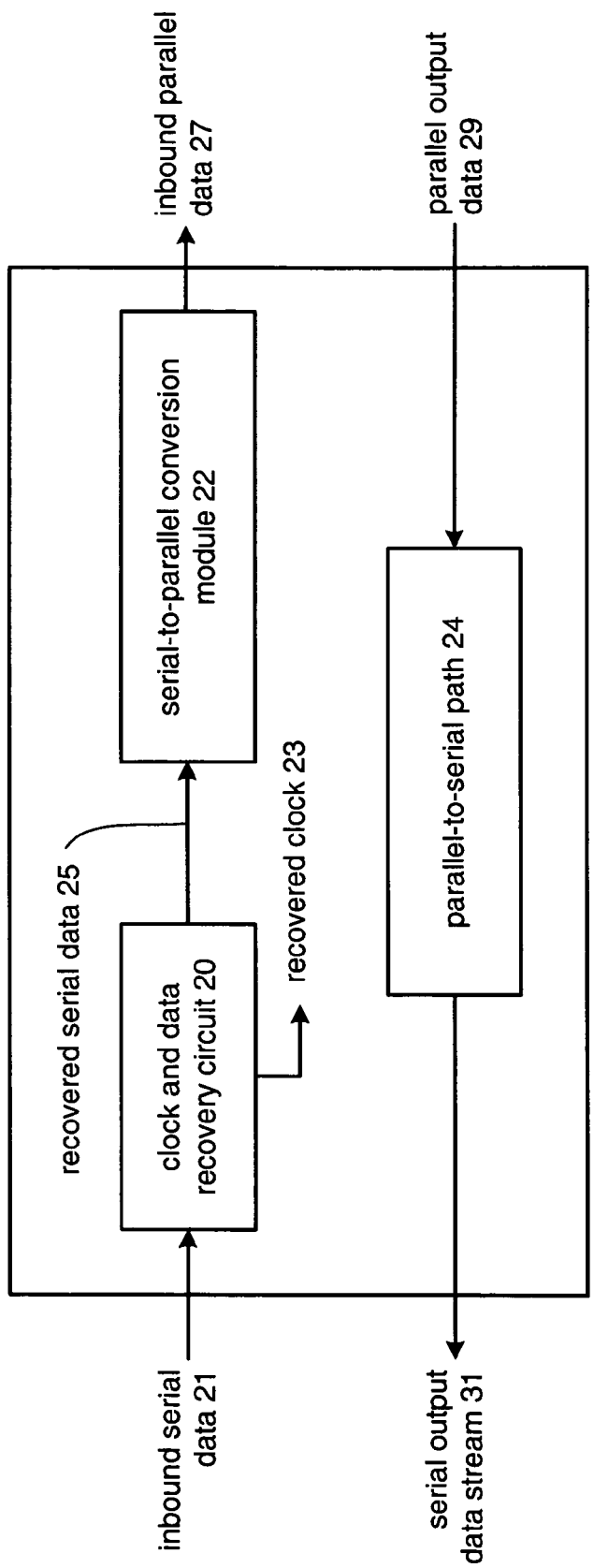
FIG. 2 is a schematic block diagram of a multi-gigabit transceiver in accordance with the present invention.

FIG. 2 is a schematic block diagram of a multi-gigabit transceiver (MGT) according to one embodiment of the present invention. The MGT includes a clock and data recovery circuit 20, a serial-to-parallel conversion module 22, and a parallel-to-serial path 24. In operation, the MGT receives parallel output data 29 from the programmable logic fabric (programmable logic fabric 12 of FIG. 1), memory (memory 16 of FIG. 1), or other sources, and converts it into serial output data stream 31. To facilitate the parallel-to-serial conversion, parallel-to-serial path 24, which may include an elastic store buffer, receives parallel-to-serial settings from the processing core to indicate the width of parallel output data 29 and the data rate of the parallel data. Based on the parallel-to-serial settings and at least one transmit clock, parallel-to-serial path 24 produces serial output data stream 31 from parallel output data 29.

The MGT also receives inbound serial data 21 from a source external to programmable logic device 10 and converts it into inbound parallel data 27. Clock and data recovery circuit 20, which will be described in greater detail with reference to FIGS. 3-8, receives inbound serial data 21 and latches the serial data at a rate substantially equal to one-half the serial data rate to produce a recovered serial data 25 and a recovered clock 23. Serial-to-parallel conversion module 22, which may include an elastic store buffer, receives recovered serial data 25 at a serial rate in accordance with recovered clock 23. Based on serial-to-parallel settings received from the processing core, serial-to-parallel conversion module 22 produces the inbound parallel data 27 to downstream components. The serial-to-parallel settings indicate the data rate and data width of the inbound parallel data 27.

As one of ordinary skill in the art will appreciate, the CDR circuit 20 may be incorporated in a variety of data receivers. For instance, the CDR circuit 20 may be used in an Ethernet compliant receiver, a fire-wire compliant receiver, and/or any other standardized or non-standardized receiver operable to receive serial data.

Figure 3:
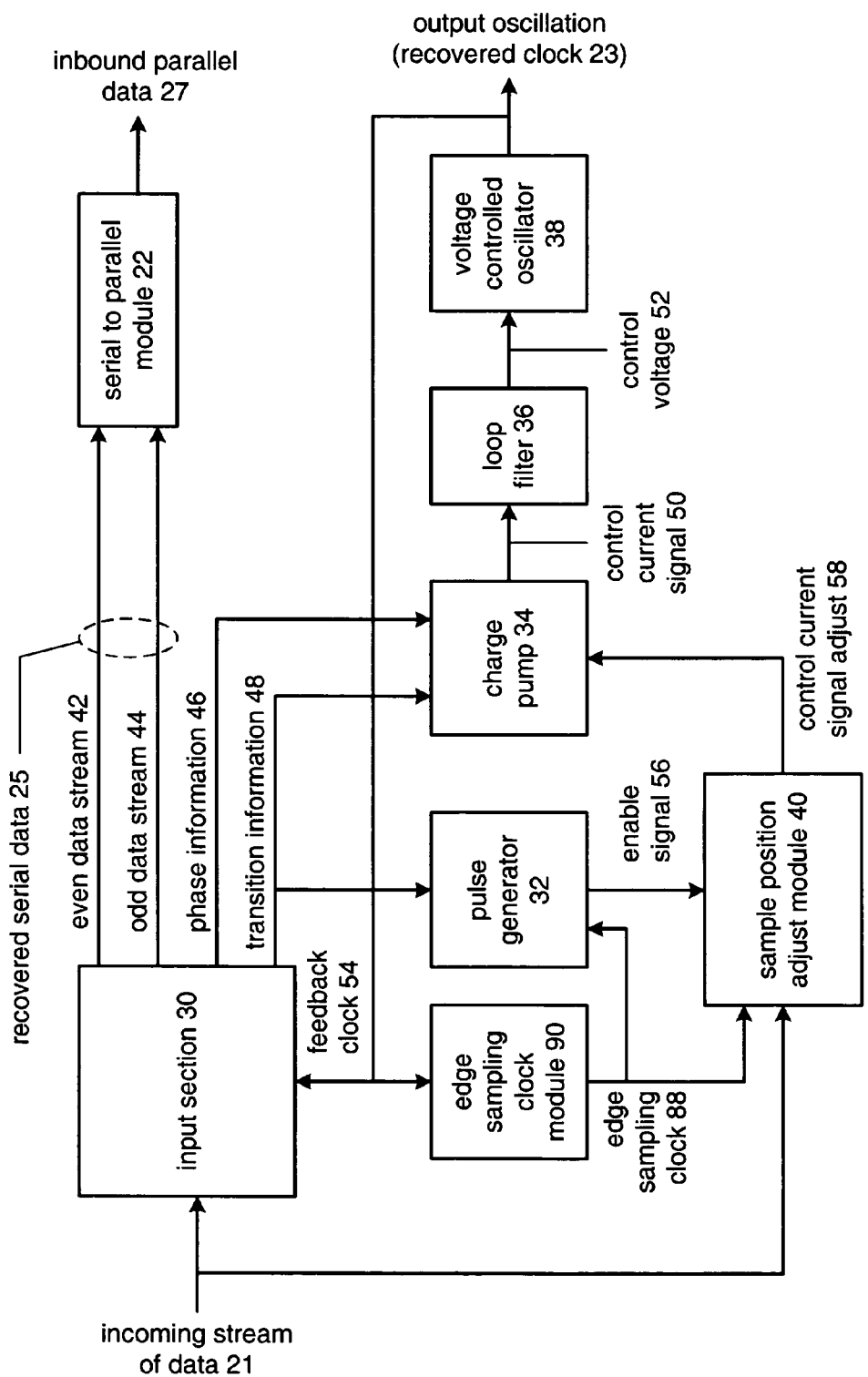
FIG. 3 is a schematic block diagram of a data and clock recovery circuit in accordance with the present invention.

FIG. 3 is a schematic block diagram of a clock and data recovery circuit 20 that includes an input section 30, a serial-to-parallel module 22, a pulse generator 32, a charge pump 34, a loop filter 36, a voltage controlled oscillator 38, an edge sampling clock module 90, and a sample position adjust module 40. In general, the clock and data recovery circuit 20 includes two loops; the $1^{st}$ loop functions as a primary loop to recapture the clock from the incoming data and the $2^{nd}$ loop functions to adjust the phase of the $1^{st}$ loop such that data sampling occurs in the center of a data bit. The $2^{nd}$ loop does this by monitoring the value at the edge of the data and adds or subtracts current to the loop filter to correct for sampling offset. Note that, in general, the primary loop has a higher gain than the second loop to insure stability of the clock and data recovery circuit 20. Further note that in one embodiment, the current provided to the charge pump 34 is less than the current produced via the $1^{st}$ loop.

In operation, the input section 30 receives the incoming stream of data 21 and a feedback clock 54 and produces therefrom an even data stream 42, an odd data stream 44, phase information 46, and transition information 48. The even and odd data streams 42 and 44 represent the recovered serial data 25. The phase information 46 indicates the phase difference between the incoming stream of data 21 and the feedback clock 54. The transition information 48 represents data transitions within the incoming stream of data 21 (e.g., changes from logic 0 to logic 1 and changes from logic 1 to logic 0). The input section will be described in greater detail with reference to FIG. 6. The serial-to-parallel module 22 receives the even and odd data streams 42 and 44 and generates therefrom the inbound parallel data 27. The functionality of the serial-to-parallel module 22 is known thus, no further discussion will be presented except to further illustrate the concepts of the present invention.

The charge pump 34 receives the phase information 46 and transition information 48 and produces therefrom a controlled current signal 50. The charge pump 34, which may be of conventional design, provides the controlled current signal 50 to the loop filter 36. As shown, the charge pump 34 also receives a controlled current signal adjust 58 that adjusts the current signal 50 to compensate for sampling offset and, since the adjustment is data dependent, noise associated therewith is spread out thereby reducing the average noise level of the CDR 20 over the operating bandwidth. The generation of the controlled current signal adjust 58 will be described in greater detail with reference to FIGS. 5 and 7-9.

The loop filter 36 converts the controlled current signal 50 into a controlled voltage 52. The voltage controlled oscillator 38 converts the control voltage 52 into an output oscillation (e.g., the recovered clock 23), which is used to produce the feedback clock 54. The construct of the charge pump 34, loop filter 36 and voltage controlled oscillator 38 are known in the art thus no further discussion will be provided except to illustrate the concepts of the present invention.

The 2$^{nd}$ loop includes the pulse generator 32, the edge sampling clock module 90, and the sample position adjust module 40. The edge sampling clock module 90 converts the recovered clock 23 into an edge sampling clock 88. In one embodiment, the edge sampling clock module 90 performs a 90° phase shift of the recovered clock 23 to produce the edge sampling clock 88. The pulse generator 32, which will be described in greater detail with reference to FIG. 4, produces an enable signal 56 based on the transition information 48 and the edge sampling clock 88. The sample position adjust module 40 receives the incoming stream of data 21, the edge sampling clock 88, and the enable signal 56 to produce the control current signal adjust 58. In one embodiment, the enable signal 56 sets a duration of adjusting the current produced by charge pump 34 to compensate for sampling offset at a greater or lesser rate. The sample position adjust module 40 will be described in greater detail with reference to FIGS. 5 and 7-9.

As one of average skill in the art will appreciate, the recovered clock 23 may be provided as the feedback clock 54 to the input section 30 directly or through a feedback divider. As one of ordinary skill in the art will further appreciate, the data recovery circuit 20 may be constructed in accordance with a half-rate architecture to recover both a clock signal 23 and data 25 from the incoming stream of data 21.

Figure 4:
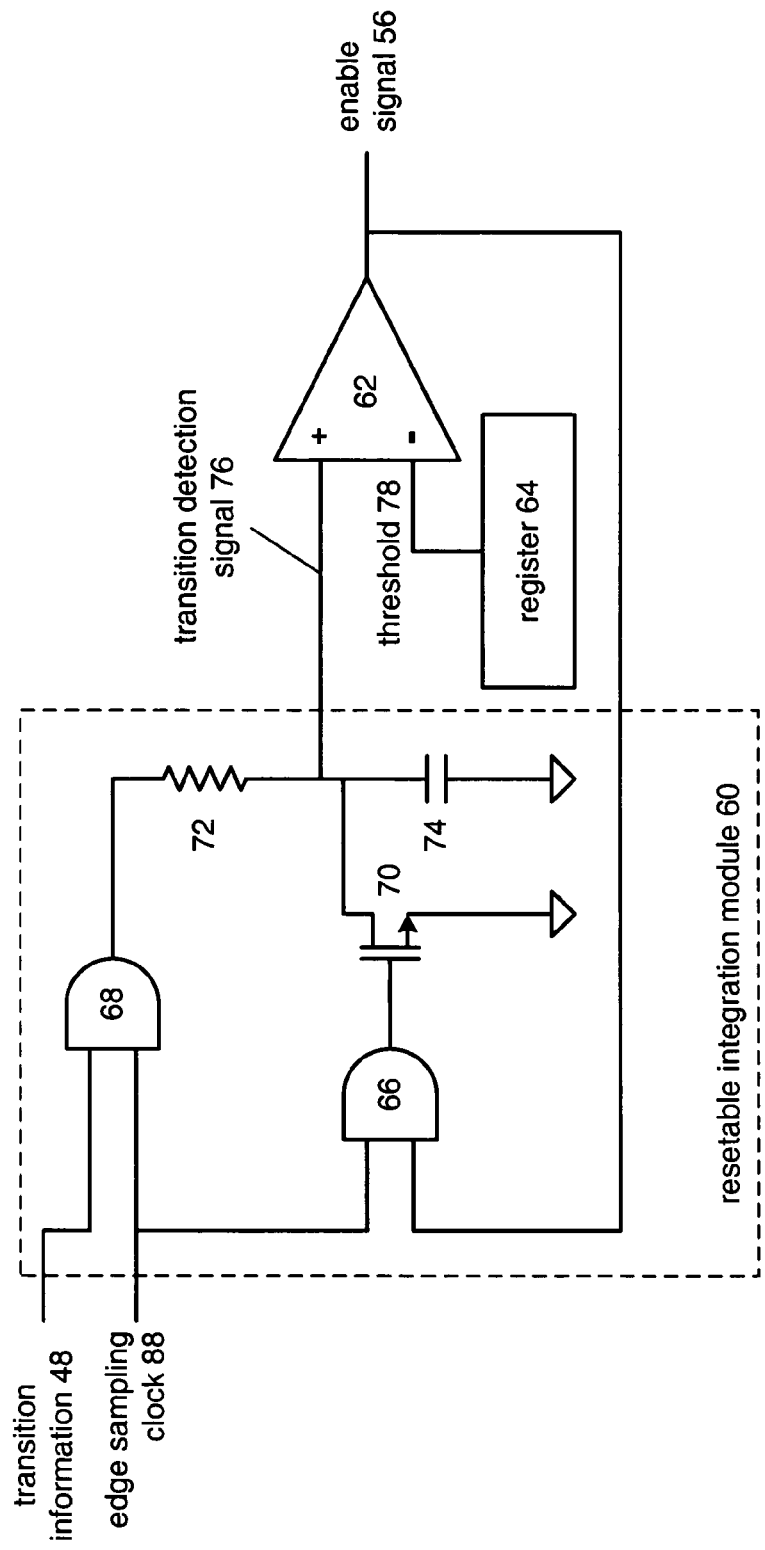
FIG. 4 is a schematic block diagram of a pulse generator in accordance with the present invention.

FIG. 4 is a schematic block diagram of an embodiment of the pulse generator 32 which includes a re-settable integration module 60 and a comparator 62. The re-settable integration module 60 includes a pair of AND gates 66 and 68, a resistor 72, a capacitor 74 and a transistor 70. In operation, the re-settable integration module 60 produces a transition detection signal 76 based on the transition information 48 and the edge sampling clock 88.

The comparator 62 compares the transition detection signal 76 with a threshold. The threshold 78 may be a fixed value or a programmable value with values stored in register 64. When the comparison between the transition detection signal 76 and threshold 78 is favorable, the comparator 62 generates the enable signal 56. The value at which the threshold 78 is set dictates the duration of the enable signal 56 which correspondingly dictates the amount of current adjust within the charge pump 34 on each adjustment of the primary loop to compensate for sampling offset. As one of ordinary skill in the art will appreciate, there are numerous ways to implement the pulse generator 32 to produce the enable signal 56 from the transition information 46 and the edge sampling clock 88.

Figure 5:
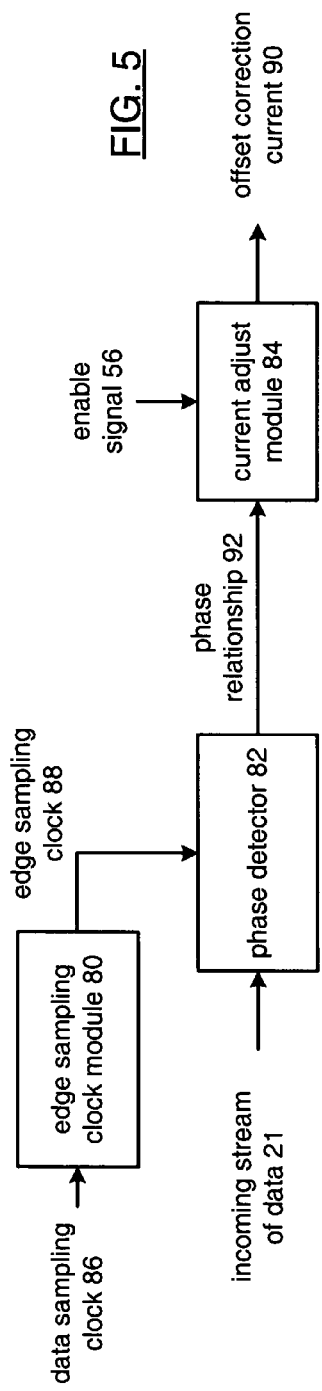
FIG. 5 is a schematic block diagram of a sample position adjust module in accordance with the present invention.

FIG. 5 is a schematic block diagram of the sample position adjust module 40 that includes a phase detector 82, and a current adjust module 84 and is operably coupled to, or includes, the edge sampling clock module 80 (an example of which is edge sampling module 90 of FIG. 3). In operation, the edge sampling clock module 80 receives a data sampling clock 86, which may be the recovered clock 23 or derived therefrom, and produces the edge sampling clock 88. In one embodiment, the edge sampling clock 88 is a 90° phase shifted representation of the data sampling clock 86.

The phase detector 82 compares the phase of the incoming data stream 21 with the edge sampling clock 88. In one embodiment, the phase detector 82 may be a bang-bang phase detector that may be implemented utilizing a master/slave latch that receives the incoming data as an input and is clocked via the edge sampling clock 88.

The current adjust module 84 produces an offset correction current 90, which corresponds to the control current signal adjust 58, based on the phase relationship information 92 and the enable signal 56. The current adjust module 84 may be a charge pump operably coupled to produce the offset correction current 90. Alternatively, the current adjust module 84 may be a voltage module that generates a voltage which effects the current produced by the charge pump 34.

Figure 6:
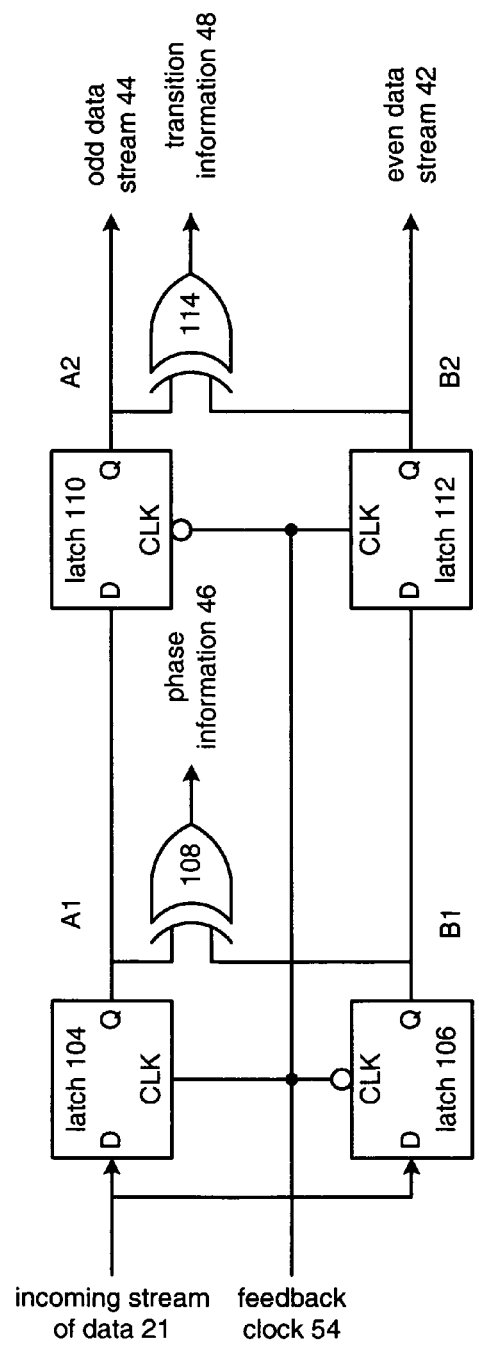
FIG. 6 is a schematic block diagram of an input section in accordance with the present invention.

FIG. 6 is a schematic block diagram of input section 30 that includes latches 104 and 106, a current mode or voltage mode exclusive OR gate 108, latches 110 and 112, which may be flip-flops, and a current mode or voltage mode exclusive OR gate 114. Latches 104 and 106 clock in the incoming data stream 21 based on the feedback clock 54 and an inversion thereof. The outputs of latches 106 and 108 are exclusive ORed together via current mode exclusive OR gate 108 to produce the phase information 46.

Latches 110 and 112 clock in the outputs of latches 104 and 106 based on the feedback clock 54 and an inversion thereof. The outputs of latches 110 and 112 are exclusive ORed together via current mode exclusive OR gate 114 to produce the transition information 48.

Figure 7:
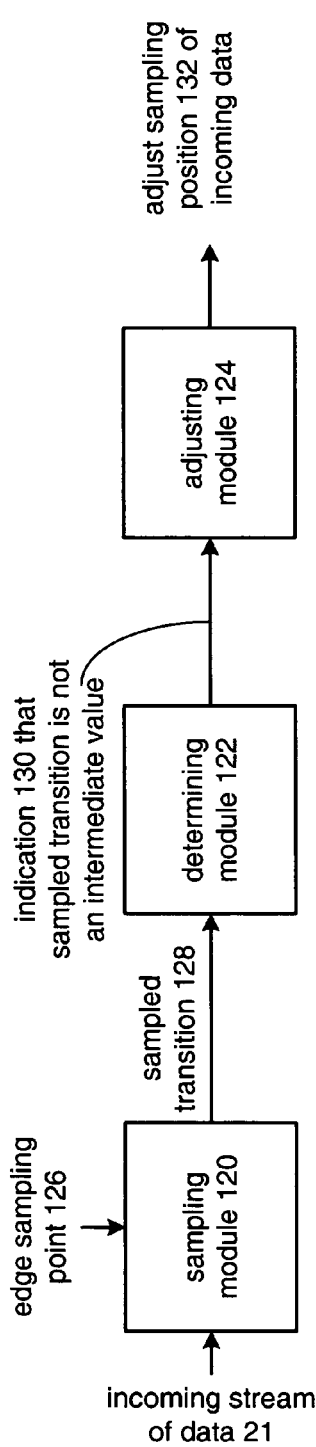
FIG. 7 is a schematic block diagram of an alternate embodiment of a sample position adjust module in accordance with the present invention.

FIG. 7 is a schematic block diagram of an alternate embodiment of a sample position adjust module 40 that includes a sampling module 120, a determining module 122 and an adjust module 124. Each of these modules 120-124 may be a single processing device or a plurality of processing devices that has associated memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 120-124 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The associated memory stores, and the processing module 120-124 executes, operational instructions corresponding to at least some of the steps and/or functions illustrated in FIGS. 7-10.

In operation, the sampling module 120 receives the incoming stream of data 21 and an edge sampling point 126, which may be derived from the edge sampling clock, to produce sampled transitions 128. As such, the sampling module 120 is determining the voltage of a transition location of the incoming stream of data 121 with respect to the edge sampling clock.

The determining module 122 determines whether the value of the sampled transition 128 is at an intermediate value. An intermediate value is a value that is in between a logic 0 and a logic 1. For example, for a supply voltage of 2 volts, a logic 0 is less than 0.2 volts and a logic 1 is above 1.8 volts. As such, in this example, an intermediate value would have a voltage between 0.2 volts and 1.8 volts. The determining module 122 produces an indication of whether the sample transition is and/or is not an intermediate value.

The adjust module 124 receives the indication and adjusts the sampling position 132 of the incoming data. The operation of the sample position adjust module 40 may be further described with reference to FIG. 8.

Figure 8:
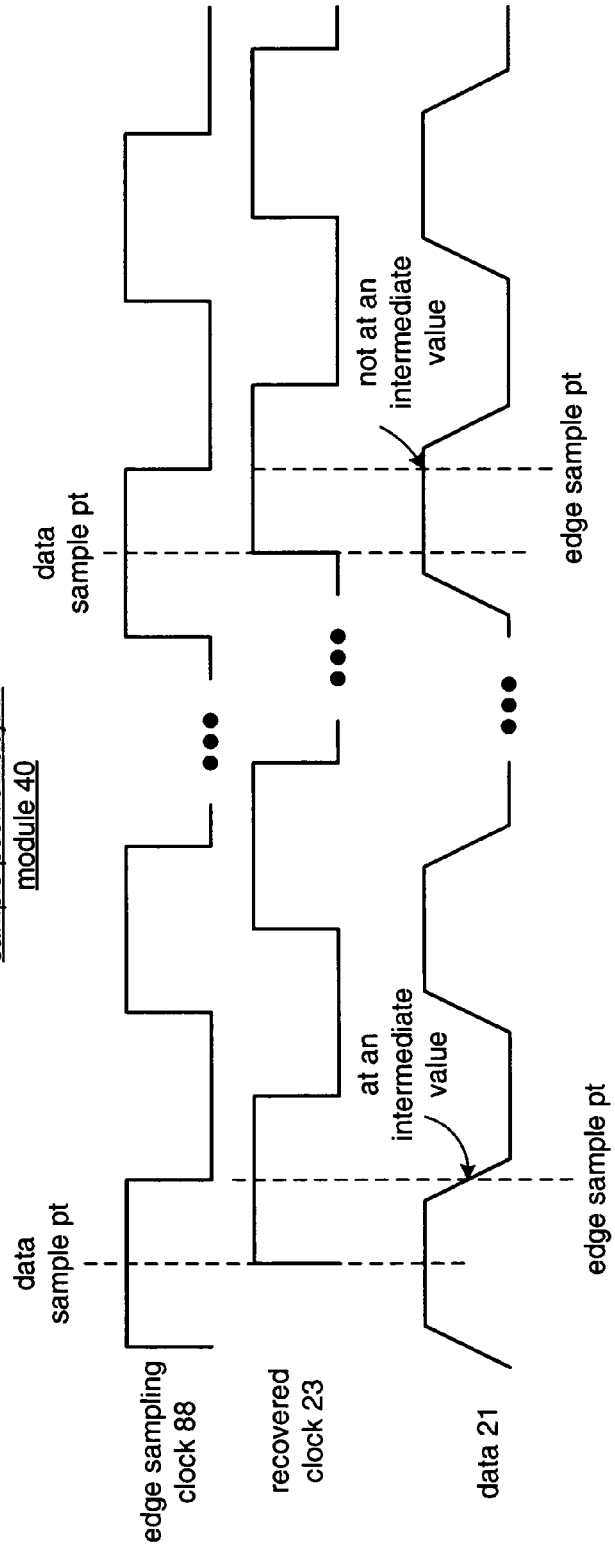
FIG. 8 is a timing diagram of the functionality of the sample position adjust module of FIG. 7.

FIG. 8 illustrates a timing diagram that includes the recovered clock 23, an edge sampling clock 88 and data 21. As is generally understood in the art, the ideal data sampling point occurs at equal distances from data transitions as depicted in the 1$^{st}$ cycle of the data 21 and corresponding recovered clock 23. As shown, the edge sampling clock 88 is a 90° phase shifted representation of the recovered clock 23. The edge sampling point corresponds to the ideal time at which the data is transitioning from a logic 0 to a logic 1 or vice versa. As such, when the data sampling point is in the desired location with respect to data 21, the sampling via the edge sampling clock 88 will yield a sampled transition 128 at an intermediate value.

As further shown in FIG. 8, as time passes, drift between the data 21 and the recovered clock 23 will occur. In this instance, the data sampling point, as shown in the 3$^{rd}$ cycle of the recovered clock 23, is not in the ideal position. Accordingly, when the data 21 is sampled in accordance with the edge sampling clock 88, the resulting value is not at an intermediate value. When the adjusting module 124 receives this information, it determines the amount of adjustment that needs to be made and in which direction. Note that the amount of adjustment may be a fixed value or calculated based on a determined sampling offset.

Figure 9:
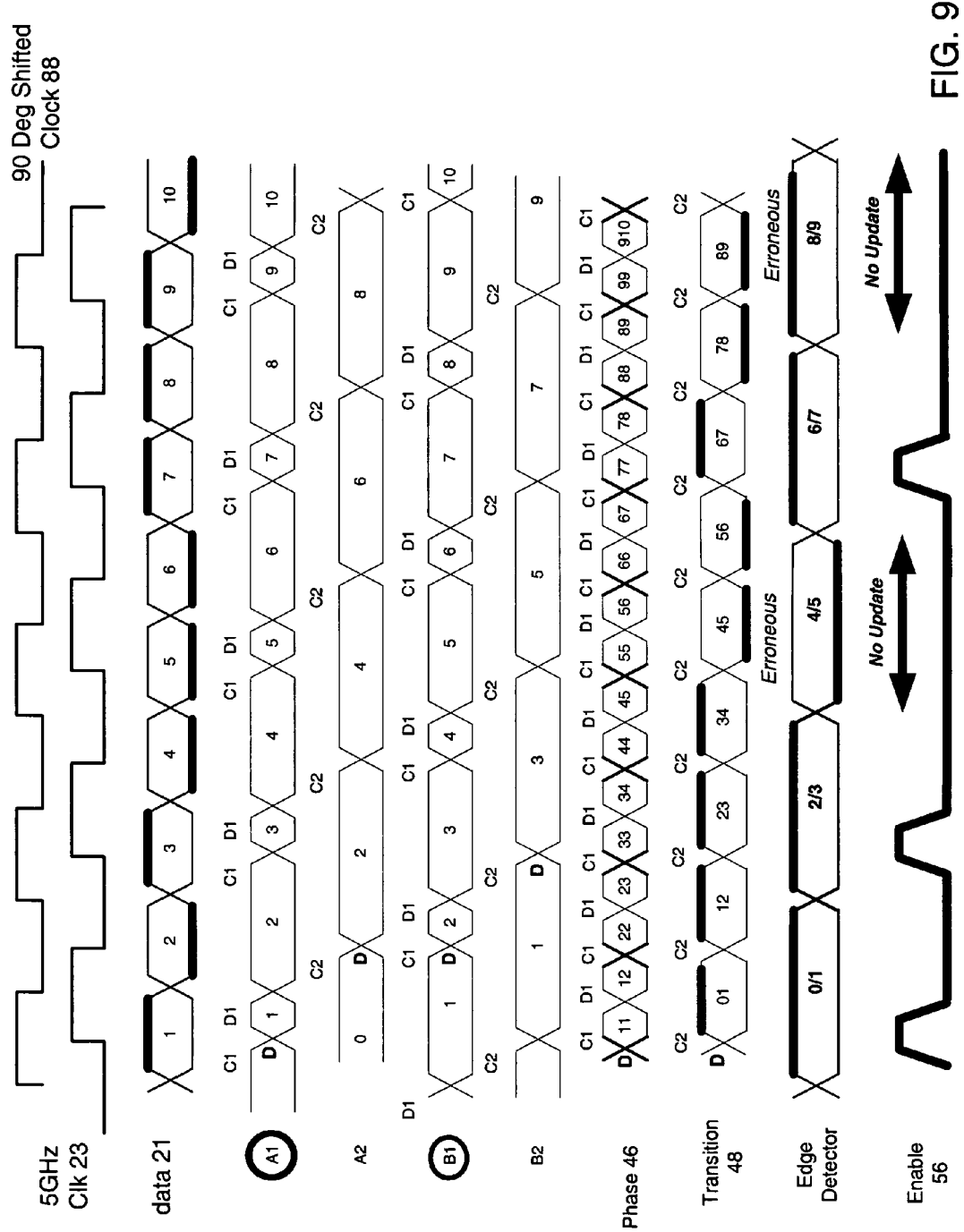
FIG. 9 is a timing diagram of the operation of the data and clock recovery circuit of FIG. 3.

FIG. 9 is a timing diagram of the operation of the clock and data recovery circuit 20 of FIG. 3 with further reference to the input section 30 as depicted in FIG. 6. The timing information of FIG. 9, which assumes a sampling offset to the right, includes the recovered clock 23, which may operate at a 5 GHz rate, the edge sampling clock 88, data 21, which may be at a 10 gigabit-per-second rate, various signals within the input section represented by A1, A2, B1, B2, the phase information 46, transition information 48, edge detection as produced by the re-settable integration module 60 of the pulse generator 32, and the enable signal 56. As shown, the edge sampling clock 88 is a 90° phase shifted representation of the recovered clock 23. The bold lines within data 21 reflect the corresponding data for that interval. As shown, when data transitions occur, phase information and transition information 46 and 48 activate the 2$^{nd}$ loop. In this illustration, the enable signal is active for various transitions such that if sampling offset has occurred, it can be corrected via the 2$^{nd}$ loop.

Figure 10:
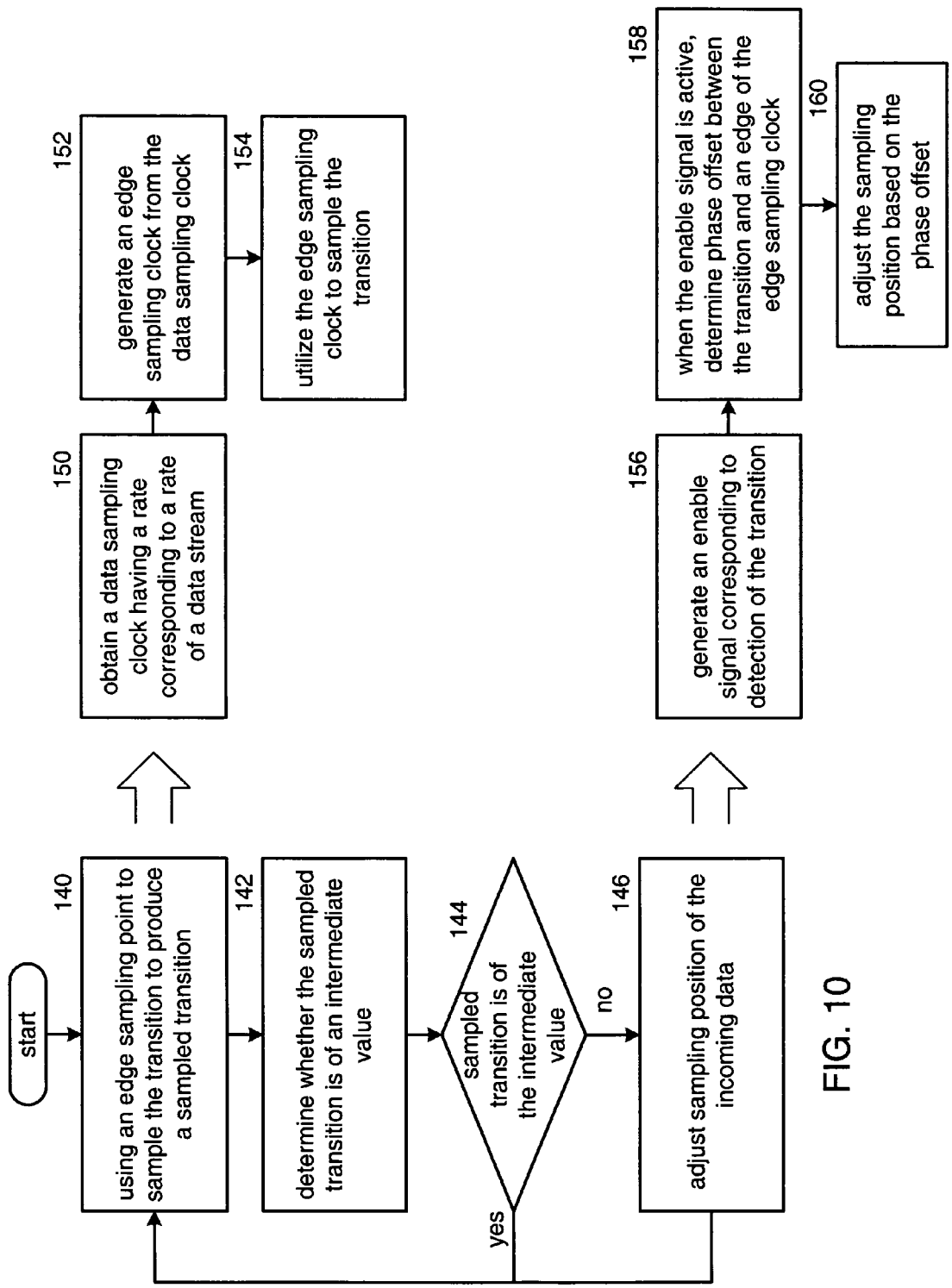
FIG. 10 is a logic diagram of a method for correcting sampling offset of a clock and data recovery circuit in accordance with the present invention.

FIG. 10 is a logic diagram of a method for correcting sampling offset of a clock and data recovery circuit. The method begins at Step 140 where edge sampling points are used to sample transitions of an incoming stream of data to produce sampled transitions. This may be done for consecutive bits of a stream of data that have a transition therebetween. In one embodiment, the processing performed at Step 140 may be done as shown with reference to Steps 150-154.

At Step 150, a data sampling clock having a rate corresponding to the rate of the stream of data is obtained. The process then proceeds to Step 152 where an edge sampling clock is generated from the data sampling clock. In one embodiment, the data sampling clock may be the recovered clock and the edge sampling clock is a 90° phase shifted representation thereof. The process then proceeds to Step 154 where the edge sampling clock is utilized to sample the transitions.

Returning to the main flow of the logic diagram of FIG. 10, the process continues at Step 142 where a determination is made as to whether the sampled transition is of an intermediate value. As previously described, an intermediate value is one that is not a logic 0 or a logic 1 with respect to the supply voltage (e.g., $V_{DD}$).

The process then proceeds to Step 144 where the method branches depending on whether the sample transition is not of the intermediate value. When the sample transition is not of the intermediate value the process proceeds to Step 146 where the sample position of the incoming data stream is adjusted. The process then reverts to Step 140. If, however, the sample transition is of an intermediate value the process repeats at Step 140.

An embodiment for adjusting the sampling position of Step 146 may be done as shown in Steps 156-158. At Step 156, an enable signal is generated that corresponds to the detection of the transitions. The process then proceeds to Step 158 where, when the enable signal is active, offset (e.g., phase difference and/or direction) is determined based on the transition and an edge of the sampling clock. Note that in one embodiment the duration of the enable signal is programmable. The process then proceeds to Step 160 where the sampling position is adjusted based on the offset.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented various embodiments for correcting sampling offset within a clock and data recovery circuit that distribute noise via the adjusting of the sampling position to reduce average noise level. As one of average skill in the art will appreciate, other embodiments may be derived from the teaching of the present invention without deviating from the scope of the claims.

What is claimed is:

1. A method for correcting sampling offset of a clock and data recovery circuit, the method comprises:
    for consecutive data bits having a transition therebetween:
        sampling, using an edge sampling point, the transition to produce a sampled transition;
        determining whether the sampled transition is of an intermediate value; and
        when the sampled transition is not of the intermediate value, adjusting sampling position of incoming data of the clock and data recovery circuit;
    wherein the intermediate value is a value that is less than a logic one and greater than a logic zero.

2. The method of claim 1 comprises:
    when the sampled transition is of the intermediate value, maintaining the sampling position of incoming data of the clock and data recovery circuit.

3. The method of claim 1, wherein the sampling the transition comprises:
   obtaining a data sampling clock having a rate corresponding to a rate of a data stream, wherein the data stream includes the consecutive data bits;
   generating an edge sampling clock from the data sampling clock; and
   utilizing the edge sampling clock to sample the transition.

4. The method of claim 3, wherein the generating the edge sampling clock comprises:
   shifting phase of the sampling clock by approximately 90°.

5. The method of claim 1, wherein the adjusting the sampling position comprises:
   generating an enable signal corresponding to detection of the transition;
   when the enable signal is active, determining offset between the transition and an edge of the edge sampling clock;
   adjusting the sampling position based on the offset.

6. The method of claim 5 comprises:
   setting a duration of the enable signal based on a programmable enable signal input;
   adjusting the sampling position based on the offset and the duration of the enable signal; and
   determining the phase offset by performing a bang-bang phase detection.

7. An apparatus for correcting sampling offset of a clock and data recovery circuit, the apparatus comprises:
   for consecutive data bits having a transition therebetween:
   sampling module operably coupled to, using an edge sampling point, sample the transition to produce a sampled transition;
   determining module operably coupled to determine whether the sampled transition is of an intermediate value; and
   adjusting module operably coupled to adjust sampling position of incoming data of the clock and data recovery circuit when the sampled transition is not of the intermediate value;
   wherein the intermediate value is a value that is less than a logic one and greater than a logic zero.

8. The apparatus of claim 7, wherein the adjusting module further functions to:
   when the sampled transition is of the intermediate value, maintain the sampling position of incoming data of the clock and data recovery circuit.

9. The apparatus of claim 7, wherein the sampling module further functions to sample the transition by:
   obtaining a data sampling clock having a rate corresponding to a rate of a data stream, wherein the data stream includes the consecutive data bits;
   generating an edge sampling clock from the data sampling clock; and
   utilizing the edge sampling clock to sample the transition.

10. The apparatus of claim 9, wherein the sampling module further functions to generate the edge sampling clock by:
    shifting phase of the sampling clock by approximately 90°.

11. The apparatus of claim 7, wherein the adjusting module further functions to adjust the sampling position by:
    generating an enable signal corresponding to detection of the transition;
    when the enable signal is active, determining offset between the transition and an edge of the edge sampling clock;
    adjusting the sampling position based on the offset.

12. The apparatus of claim 11 comprises:
    the adjusting module further functions to:
    set a duration of the enable signal based on a programmable enable signal input; and
    adjust the sampling position based on the offset and the duration of the enable signal; and
    the determining module including a bang-bang phase detector to determine the phase offset.

13. A clock and data recovery (CDR) circuit with dynamic offset adjust, the CDR circuit comprises:
    an input section operably coupled to receive an incoming stream of data and a feedback clock and produce, therefrom, an even data stream, an odd data stream, phase information of the incoming stream of data, and transition information of the incoming stream of data;
    a pulse generator operably coupled to produce an enable signal from the transition information;
    a charge pump operably coupled to produce a control current signal based on the phase information and the transition information;
    a loop filter operably coupled to produce a control voltage based on the control current signal;
    voltage controlled oscillator operably coupled to produce an output oscillation based on the control voltage, wherein the feedback clock is based on the output oscillation; and
    sample position adjust module operably coupled to adjust the control current signal based on the enable signal and an edge of the incoming stream of data.

14. The CDR circuit of claim 13 further comprises:
    a serial to parallel module operably coupled to convert the even data stream and the odd data stream into parallel data words.

15. The CDR circuit of claim 13, wherein the pulse generator comprises:
    resetable integration module operably coupled to produce a transition detection signal based on the transition information and the feedback clock; and
    a comparator operably coupled to compare the transition detection signal with a threshold, wherein, when the transition detection signal compares favorably with the threshold, the comparator produces the enable signal.

16. The CDR circuit of claim 15, wherein the pulse generator further comprises:
    a register for storing variable threshold values for the threshold such that duration of the enable signal is selectable.

17. The CDR circuit of claim 13, wherein the sample position adjust module comprises:
    an edge sampling clock module operably coupled to produce an edge sampling clock from a data sampling clock;
    a phase detector operably coupled to detect a phase relationship between the edge of the incoming stream of data and the edge sampling clock; and
    current adjust module operably coupled to produce an offset correction current based on the phase relationship when the enable signal is in a first state, wherein the offset correction current is combined with the control current signal.

18. The CDR circuit of claim 17 comprises:
    the phase detector including a bang-bang phase detector; and
    the current adjust module including a charge pump operably coupled to produce the offset correction current based on the phase relationship.

19. The CDR circuit of claim 18, wherein the bang-bang phase detector comprises:
    a master-slave latch receiving the incoming stream of data as an input and clocked via the edge sampling clock.

* * * * *